March 31, 1953 A. P. DOUGLAS ET AL 2,633,371
JUVENILE VEHICLE DRIVING AXLE AND HANGER ASSEMBLY
AND METHOD OF MANUFACTURING THE SAME
Filed Aug. 14, 1950
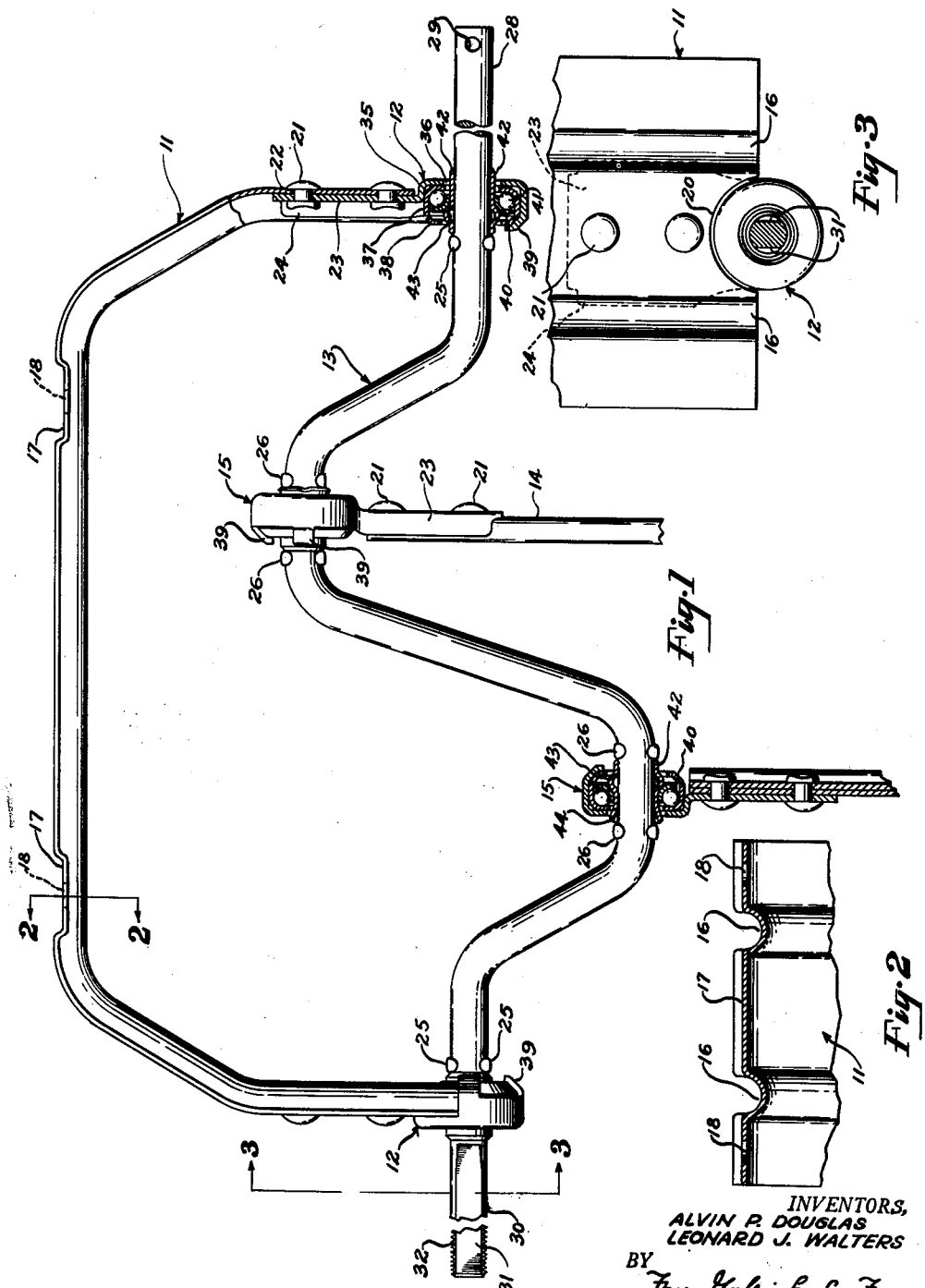
INVENTORS,
ALVIN P. DOUGLAS
LEONARD J. WALTERS
BY
Fay, Golrick & Fay
ATTORNEYS Patented Mar. 31, 1953

2,633,371

UNITED STATES PATENT OFFICE 2,633,371

JUVENILE VEHICLE DRIVING AXLE AND HANGER ASSEMBLY AND METHOD OF MANUFACTURING THE SAME

Alvin P. Douglas, Cleveland, and Leonard J. Walters, Shaker Heights, Ohio, assignors to The Murray Ohio Manufacturing Company, Cleveland, Ohio, a corporation of Ohio Application August 14, 1950, Serial No. 179,362

2 Claims. (Cl. 280—256)

The present invention relates to improvements in the driving axle and hanger assembly for pedal driven juvenile wheeled vehicles and a method of manufacturing the same. An object of the present invention is the provision of a structure for the driving axle and hanger assembly for pedal driven juvenile vehicles which is rugged, yet easy and of comparatively low cost in fabrication. Another object is the provision of a driving axle assembly on which the axle is completely journalled in ball or roller type bearings to decrease the effort required in driving the vehicle. Another object of the invention is to provide a driving axle and hanger assembly which may be sub-assembled for incorporation into the body of the juvenile vehicle as a unit. A further object of the invention is the provision of an improved method for fabricating a driving axle and hanger assembly. With the above and other objects in view, which will be apparent from the detailed description which follows, the invention consists in certain novel features of construction and combination of parts which will be readily understood by those skilled in the art to which the invention appertains.

In the drawing, which illustrates an embodiment of the invention—

Fig. 1 is an elevation which may be either from the front or the rear of the hanger and driving axle assembly of this invention, with the pull-straps which connect the pedals of the vehicle to the crank portions of the driving axle shown, for the sake of clarity, swung out of the normal approximately horizontal position and positioned vertically;

Fig. 2 shows a cross-section of the hanger member and is taken along the line 2—2 of Fig. 1; and Fig. 3 is a fragmentary side view showing the driving end of the axle in section taken along line 3—3 of Fig. 1.

The structure of this invention which constitutes what is usually the rear part of the vehicle undercarriage comprises in general the hanger member 11 mounted on the underside of the vehicle and having an inverted U-shape, to the ends of which are attached, in any suitable manner, bearings 12 through which pass the ends of driving crank axle 13 which is rotated by the reciprocating motion of pull straps 14 connected to the crankpin portions of the axle by bearings 15. Only the rearward portions of the pull straps are shown, the forward portions thereof and the driving pedal members usually attached to the forward part of the vehicle chassis being omitted.

By the usual methods of stamping and drawing, known to the metal working art, the hanger member is formed from sheet metal to a general shape such as that shown in the drawing. The hanger is provided with a plurality of longitudinally extending reinforcing grooves or channels 16 to impart structural rigidity thereto. To aid in locating and affixing the hanger rigidly to the vehicle body, channels 17, transverse to the long dimension of the hanger and provided with bolt holes 18 are formed in the top surface of the hanger, coresponding in shape and spaced relation to bosses formed on the bottom of the vehicle body to which the hanger is to be fastened. The ends of the hanger are notched at 20 to accommodate the casing or retainer of bearings 12 which may be attached, as here shown, by rivets 21 passed through apertures 22 in the hanger member and the bearing retainer tang 23 positioned between the parallel grooves 16. For increased strength and rigidity, the sides 24 of the tang may be flanged to conform to the inwardly projecting sides of grooves 16 against which they abut. Driving crank axle 13, which may be formed of metal rod, is journaled inwardly from its ends in the bearings 12 and is provided with nibs 25 to space the inner race retaining sleeves 42 of these end bearings from inward displacement and also with nibs 26 on the crankpin portions to maintain the inner race retaining sleeves 42 of the pull-strap bearings 15 in position. One end 28 of the axle is of circular cross-section to provide free rotation for one wheel (not shown) which is retained thereon by any suitable means, such as a pin passed through aperture 29. The other end 30, the driving end of the axle, made non-circular by the provision of the flat portions 31, mounts and drives a wheel (not shown) having a hub aperture of corresponding form. This driven wheel may be retained on the driving end of the axle by a nut screwed on to the threaded portion 32.

The bearings 12 and 15 are generally of the same construction, comprising a tank 23 extending from the cup-shaped bearing retainer or casing 35 which is provided with an aperture 36 through which the axle, with the inner race retaining sleeve, extends, an outer race 37 retained in the casing by a dished apertured ring 38 held in position by the bent-over lugs or nibs 39 of the bearing casing, an inner race 40, ball bearings 41 between the inner and outer races, and a bearing inner race retaining sleeve 42 having a circumferential inner race retaining ridge 43. In the case of bearing 12, the inner sleeve 42 is press-fitted into the inner race and is slip-fitted to the axle, while in the case of the bearings 15, the inner race is slip-fitted over the sleeve 42 but the sleeve is formed around the crankpin portion between nibs 26 by a curling or pressing operation performed on a preformed U-shaped blank. The tang 23 of bearing 15 is shaped to conform to the exterior of pull-straps 14 to which it is riveted as shown here. In bearings 15, further, the axle sleeves 42 are deformed at the outer end, as by the provision of a plurality of outward expansions or nibs 44 disposed on the side of the inner race opposite to the ridge 43 to retain the inner race in position therebetween.

In the fabrication of the assembly, sheet metal blanks, preformed to a U-shape and provided with a ridge 43, are placed over the crankpin portions of the axle between nibs 26 and then pressed or curled to form a cylindrical sleeve. Pull-straps, on which bearings 15 are already riveted, are then passed over the axle and brought on to the sleeves 42 whereon they are secured in place by locally expanding the sleeves at several points between their outer ends and the inner races to form nibs 44. The bearings 12 with their inner sleeves 42 press-fitted into the inner races are slipped over the ends of the axle shaft and the bearings are then riveted in place by rivets 21 passed through the hanger member and the tang 23 of the bearing retainer to complete the sub-assembly. This sub-assembly may then be incorporated into the vehicle by positioning the hanger against the bottom of the vehicle body with the channel 17 in place on apertured bosses provided on the vehicle body, thereby bringing the apertures readily into register with the corresponding apertures of the body for bolting the members together. The forward end of the pull-straps are then simply secured to the pedal members through which the vehicle is driven by foot pressure.

From the foregoing it will be apparent to those skilled in the art that we have provided a bearing structure and manner of associating the same with the crank axle and axle hanger of juvenile vehicles of the type referred to, which permit of an order of assembly of the bearing mechanisms involved upon both the axle and the hanger bracket in a durable, economical and permanent manner practicable in rapid production, while at the same time a structure is obtained having reasonable accuracy of bearing and shaft relationship that decreases the juvenile effort required to propel the vehicle. This is feasible to a great extent by reason of the preliminary formation and the bearing positioning and retaining function of the sleeves 42 at the crank bearings.

We claim:

1. A method of manufacturing a double crankpin type driving axle and axle hanger assembly for a double pull-strap pedal driven juvenile wheeled vehicle wherein opposite ends of said axle are journalled in bearings supported by depending legs of said hanger, comprising the steps of forming a generally U-shaped axle hanger member having a yoke portion thereof adapted for affixing to the bottom of a vehicle body and axle support legs; forming metal rod stock into a double crankpin type driving axle having aligned wheel mounting end portions each having an inwardly spaced bearing stop formation and having on each crankpin portion thereof a pair of longitudinally spaced nibs; preforming sheet metal blanks to generally U-shaped elements each having a ridge running external to the U-contour thereof near one end of the blank; positioning a pre-formed blank between the nibs on each crankpin portion of the driving axle with the said ridge disposed toward the middle of the axle and curling the positioned blanks about the crankpin portions to form thereon sleeve elements having circumferential ridges near the inner ends thereof; securing antifriction bearing to pullstraps and sliding the bearings of the pullstraps over the axle ends into position on said sleeve elements against said ridges; deforming the outer ends of said sleeves against the bearings to retain the bearings in position; sliding axle support bearing assemblies onto the axle ends against the said stop formations; and securing the said bearing assemblies to the legs of said hanger member.

2. For a pull strap pedal driven juvenile wheeled vehicle, a driving axle and hanger assembly comprising an axle hanger member of sheet metal formed to generally inverted U-shape, said member having a yoke portion adapted for attachment to the bottom surface of a vehicle body and depending leg portions; axle supporting anti-friction bearing assemblies secured to the bottoms of said legs; a double crank type driving axle formed of rod stock having the opposite end portions thereof extending through said bearing assemblies for mounting wheels thereon, and having a stop formation on each end portion inward of each bearing assembly for maintaining the position of said axle relative to said bearing assemblies, said axle being bent to provide a pair of crankpin portions between said end portions, each crankpin portion having a longitudinally spaced pair of nibs thereon; a pull strap bearing locating sleeve disposed between the nibs of each crankpin portion constituted of a sheet metal blank wrapped into sleeve shape about the crankpin portion; pull straps for the crankpin portions; and pull strap anti-friction bearings connecting the pull straps to corresponding crankpin portions, each said bearing including a casing secured to a pull strap and an inner race held in position by the locating sleeve on the corresponding crankpin portion, the said inner race having a bore size relative to bent portions, the stop formation and nibs of the axle permitting the bearing to be passed endwise over the axle into place on the locating sleeve, and the said inner race being held on the sleeve and thereby locating the pull strap bearing by projecting formations on the sleeve engaging opposite sides of the inner race.

ALVIN P. DOUGLAS.
LEONARD J. WALTERS.

REFERENCES CITED

The following references are of record in the file of this patent:

UNITED STATES PATENTS

| Number | Name | Date |
| --- | --- | --- |
| 1,232,416 | Whitt | July 3, 1917 |
| 1,444,655 | Bukolt | Feb. 6, 1923 |

FOREIGN PATENTS

| Number | Country | Date |
| --- | --- | --- |
| 325,103 | Great Britain | Feb. 13, 1930 |
| 627,185 | France | May 30, 1927 |